Aug. 30, 1932.     J. M. HENDERSON     1,874,748
DEPOLARIZING MIX FOR DRY CELLS
Filed June 4, 1930
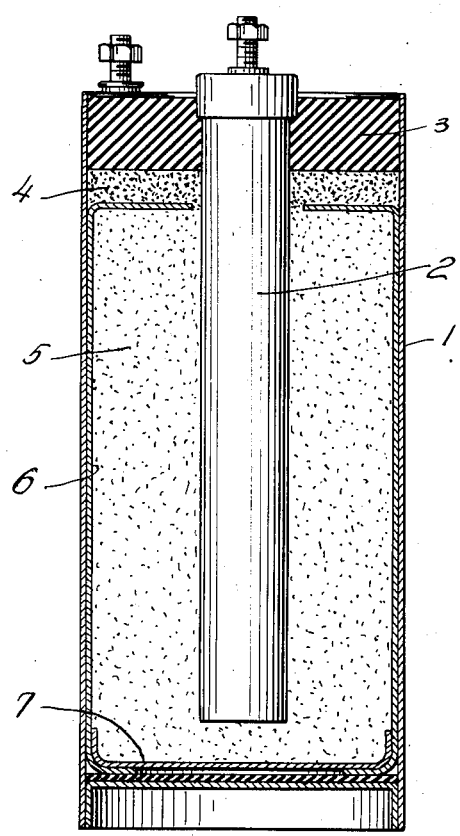
INVENTOR
Joseph M. Henderson
BY
Pennie, Davis, Marvin & Edmonds
ATTORNEYS Patented Aug. 30, 1932

1,874,748

UNITED STATES PATENT OFFICE

JOSEPH M. HENDERSON, OF MADISON, WISCONSIN, ASSIGNOR TO BURGESS BATTERY COMPANY, OF MADISON, WISCONSIN, A CORPORATION OF WISCONSIN

DEPOLARIZING MIX FOR DRY CELLS

Application filed June 4, 1930. Serial No. 459,135.

This invention relates to depolarizing mixes for dry cells of the LeClanche type and especially those of the paper-lined type.

It is the object of this invention to provide a depolarizing mix which maintains a pressure against the electrodes of the dry cell throughout the life of the cell and thereby decreases the contact resistance. It is a further object to increase the porosity of the mix to make it more permeable to the gases liberated by the reactions in the dry cell made therefrom.

The accompanying drawing is a sectional elevation of a dry cell constructed in accordance with my present invention.

The zinc electrode 1 is of tubular shape, as in common practice, though it may be square or of any other convenient shape. The negative electrode 2 is usually of carbon, 3 is the pitch seal, 4 the expansion space which may contain sand and sawdust, and 5 the depolarizing mix of manganese dioxide, carbon and graphite and the salammoniac zinc chloride electrolyte. Graphitic oxide, as described in B. K. Brown Patent No. 1,639,983 may be used in place of the manganese dioxide. 6 is the bibulous envelope of blotting or other suitable paper such as that described in A. W. Schorger Patent No. 1,608,623. A paper bottom 7 is placed at the bottom of the cell.

In this type of cell the moist depolarizing mix is tamped solidly into place between the positive electrode or carbon rod 2 and the paper-lined negative zinc electrode 1. The tamping operation also makes a good contact between the mix and the electrodes and thereby cuts down the contact resistance, this being necessary to obtain a low internal resistance. This contact resistance, however, increases again with age as the mix dries out, or for other reasons. This increase is evidenced by the lower short circuit flash of the cell. By bringing inward pressure to bear on the container the contact resistance is again lowered so that the flash again becomes normal.

I have found that if particles of an elastic material, preferably moisture-repellant and in granular form, are incorporated into the depolarizing mix, the mix maintains the desired pressure against the electrodes during the life of the cell. Especially suitable elastic materials which are inactive chemically and moisture-repellant are cork and porous rubber similar to that used for making porous rubber bath sponges. It is also possible to use particles of solid rubber and rubber substitutes, such as polymerized tung and corn oils, and cork-like materials such as birch bark. A substantial quantity of this material is incorporated with the mix which is moistened and tamped into the cell in the usual way. Although the incorporation of more than a small proportion of these elastic materials into the mix causes the preformed cores of the so-called bag-type cells to disintegrate when removed from the mold, it does not cause any loosening of the mix when tamped into the paper-lined type of cell. The elastic material is compressed during the tamping operation and remains under compression during the life of the cell to cause the depolarizing mix to press against both electrodes.

The amount of cork or other elastic material which may be used may vary over a wide range depending upon the type of service which is required. For the commercial telephone cell it is possible to add at least a volume of ground or granulated cork equivalent to the volume of manganese ore used with some adjustment of the other ingredients. Such a cell shows a greatly increased life on on the light intermittent tests required for such cells. Furthermore, the cell is lighter in weight and the material cost is lower. In cells which are subject to heavy drains it is not desirable to add as much cork, though one-half of the above amount may be used.

The particle size of the elastic material may vary over a considerable range. I have obtained excellent results with cork ground so that most if it is retained on a 28 mesh screen and passes through a 10 mesh screen. A granular product is preferable since powdered non-conductive fillers in depolarizing mixes usually increase unduly the internal resistance of the dry cell.

The granular elastic material makes the tamped mix more porous and allows any gases, such as hydrogen, liberated during the service to escape more readily to the top of the mix and out through the edges of the seal. If these gases cannot escape they may cause the can to bulge or they may cause the entire cell interior to be forced upward by thereby forcing the seal from the can.

I claim:

1. In a dry cell of the paper lined type, having a negative electrode and a positive electrode, a depolarizing mix comprising compressed particles of easily compressible, elastic material between said electrodes, said mix exerting pressure against the negative and positive electrodes.

2. In a dry cell of the paper lined type, having a negative electrode and a positive electrode, a depolarizing mix comprising granular compressed cork between said electrodes, said mix exerting pressure against the negative and positive electrodes.

3. The process of preventing increase of contact resistance of a dry cell with age which comprises mixing particles of easily compressible, elastic material throughout a moist depolarizing mix and tamping said mix in place between the electrodes of the cell.

4. In a dry cell of the paper lined type having a negative electrode and a positive electrode, a depolarizing mix comprising particles of compressed rubber between said electrodes, said mix exerting pressure against the negative and positive electrodes.

5. The process of preventing increase of contact resistance of a dry cell with age which comprises mixing granular cork throughout a moist depolarizing mix, and tamping said mix in place between the electrodes of the cell.

6. The process of preventing increase of contact resistance of a dry cell with age which comprises mixing particles of rubber throughout a moist depolarizing mix, and tamping said mix in place between the electrodes of the cell.

In testimony whereof I affix my signature.

JOSEPH M. HENDERSON.